United States Patent [19]

Ditzig

[11] Patent Number: 5,156,242
[45] Date of Patent: Oct. 20, 1992

[54] HELICAL TELEPHONE CORD WINDING DEVICE

[75] Inventor: Albert F. Ditzig, Hoffman Estates, Ill.

[73] Assignee: Al-Ro Inc.

[21] Appl. No.: 798,942

[22] Filed: Nov. 27, 1991

[51] Int. Cl.⁵ .................................. H02G 11/02
[52] U.S. Cl. .................... 191/12.2 R; 191/12.4
[58] Field of Search .......... 191/12 R, 12.2 R, 12.2 A, 191/12.4

[56] References Cited

U.S. PATENT DOCUMENTS

| | | | |
|---|---|---|---|
| 538,095 | 4/1895 | Aitchison | 191/12.2 R |
| 1,024,417 | 4/1912 | Pagnod | 191/12.2 R |
| 1,159,124 | 11/1915 | Steen | 191/12.2 R |
| 1,243,039 | 10/1917 | Carroll et al. | 191/12.4 |
| 1,397,633 | 11/1921 | Hite | 191/12.2 R |
| 2,270,997 | 1/1942 | Davis | 191/12.4 |
| 2,587,707 | 3/1952 | Dever | 191/12 R |
| 2,611,834 | 9/1952 | Simons | 191/12.4 |
| 2,678,779 | 5/1954 | Bellmer | 191/12.2 R |
| 3,128,857 | 4/1964 | Walton | 191/12.2 R |
| 3,144,218 | 8/1964 | Tepe | 191/12.2 AX |
| 3,147,833 | 9/1964 | McWilliams | 191/12.4 |
| 3,373,954 | 3/1968 | Hilsinger, Jr. | 191/12 R X |
| 3,743,796 | 7/1973 | Rosenscrantz | 191/12.2 A |
| 3,806,671 | 4/1974 | Anderson | 191/12.2 R |
| 4,073,449 | 2/1978 | Pilat | 191/12.4 X |
| 4,646,987 | 3/1987 | Peterson | 191/12.2 R X |
| 4,946,010 | 8/1990 | DiBono | 191/12.2 R |
| 5,117,456 | 5/1992 | Aurness et al. | 191/12.2 RX |

FOREIGN PATENT DOCUMENTS

| | | | |
|---|---|---|---|
| 1057821 | 11/1953 | France | 191/12.2 |
| 555484 | 6/1977 | U.S.S.R. | 191/12.2 R |
| 860192 | 8/1981 | U.S.S.R. | 191/12.2 A |

Primary Examiner—Frank E. Werner
Assistant Examiner—Scott L. Lowe
Attorney, Agent, or Firm—Charles F. Meroni, Jr.

[57] ABSTRACT

The cord winding device of the present invention includes a housing within which a spring biased spool is engaged. The biasing spring is internal of the spool, creating a simple device which is small in size. Engagement of the spool to the housing is created with a yoke-like structure, allowing the device to function without regard to its orientation. The spool is provided with a high walled helical channel in its outer surface, within which a single layer of cord can be secured with turns of the cord being isolated from one another. The cord is pinched in position when placed at a severe angle from its coiled angle. Further, a double contact rotary contact assembly which is able to accommodate up to eight conductors is provided within the housing, creating devices by which current can be transferred from conductors of a fixed in position terminal end cord to conductors of the cord rotatably secured to the spool within the device without causing twisting of the cord.

17 Claims, 3 Drawing Sheets

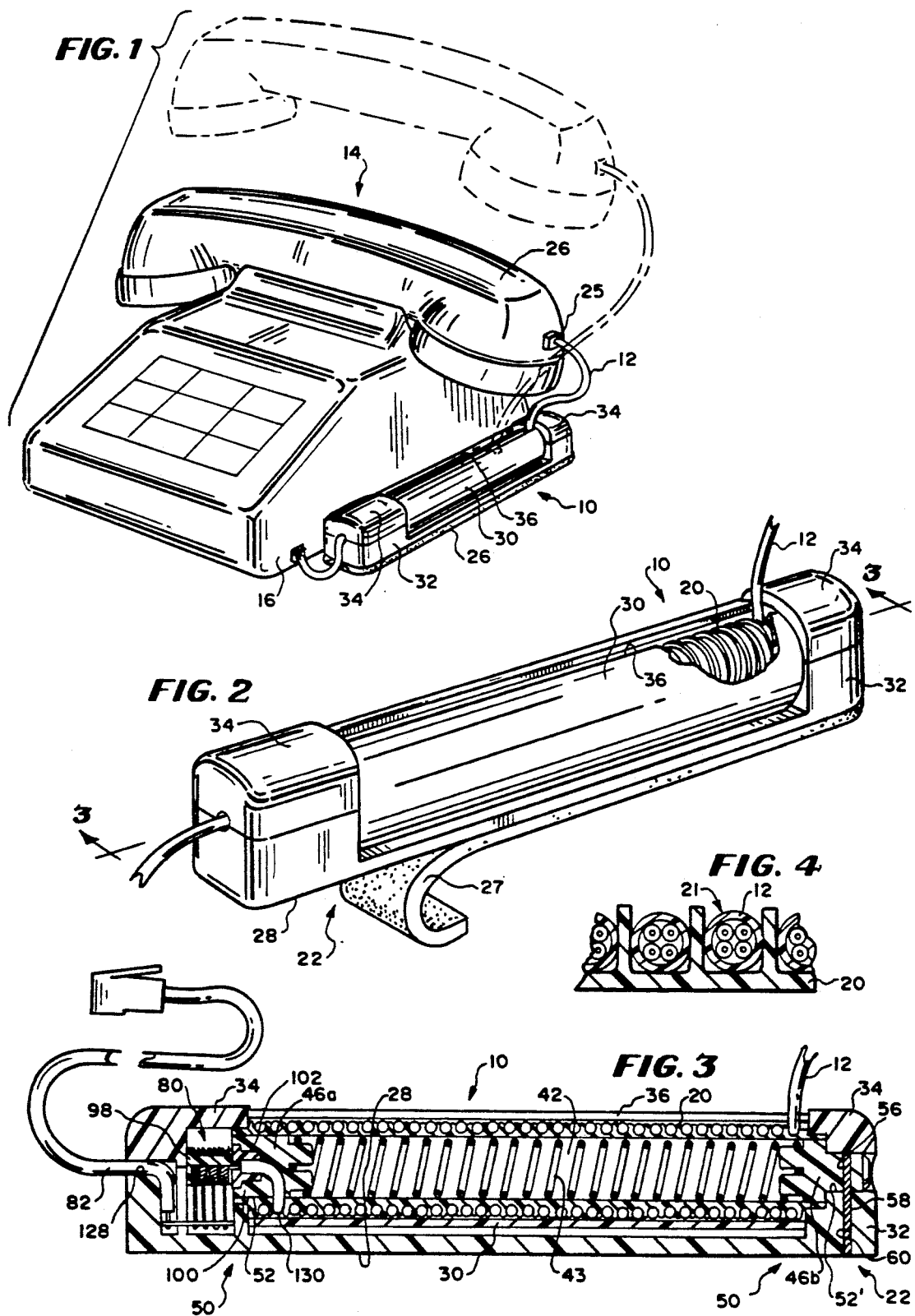

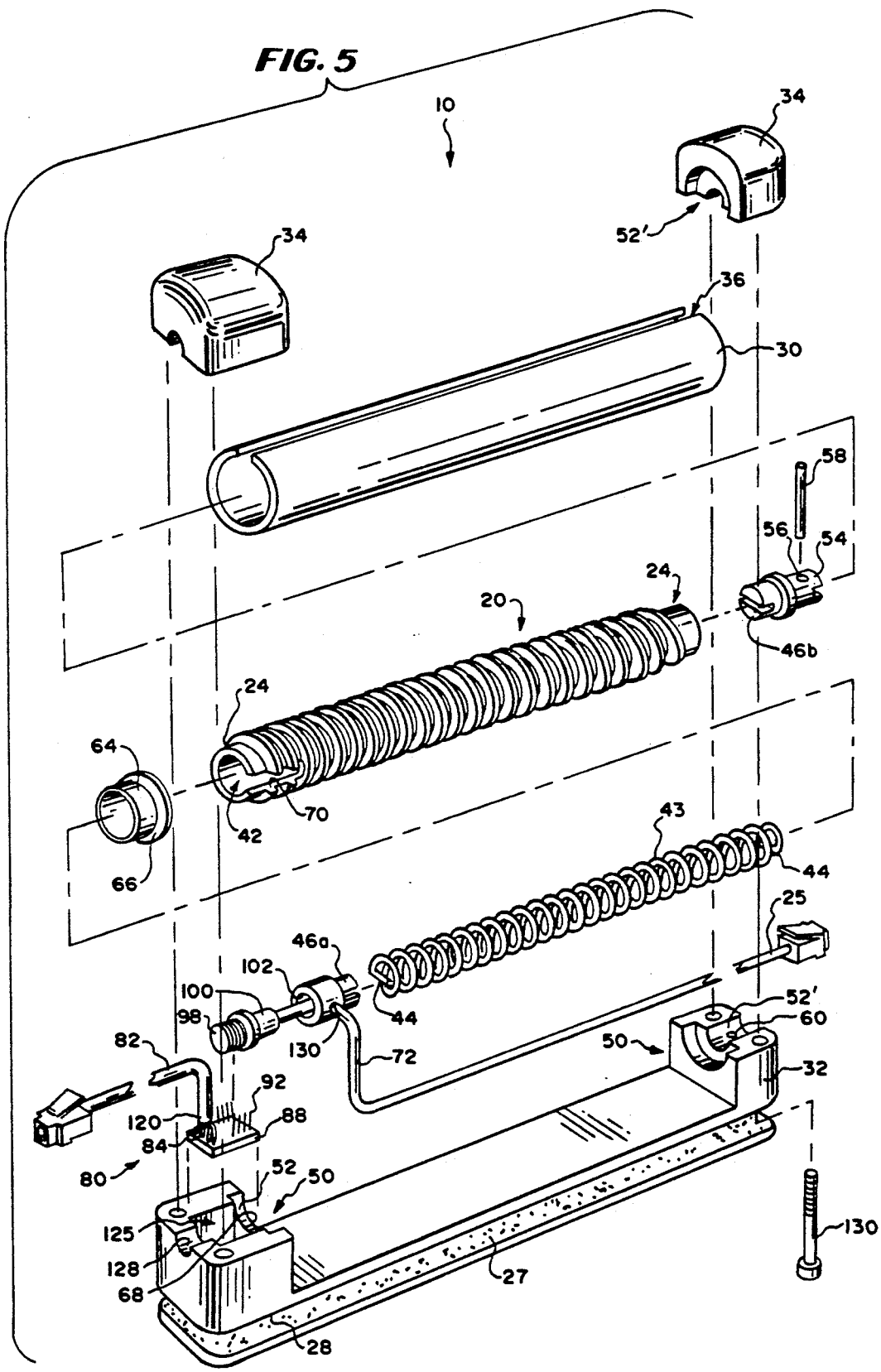

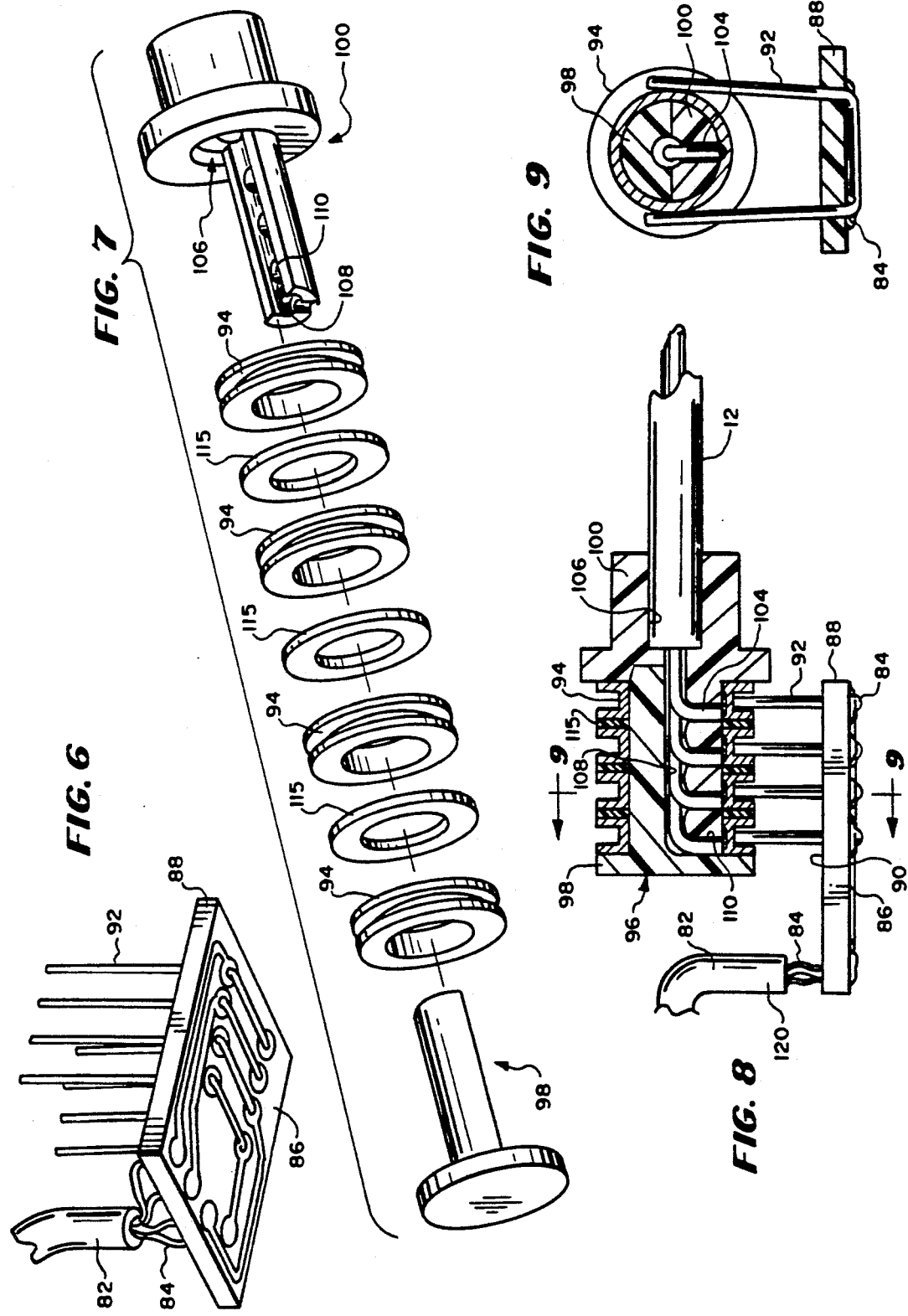

HELICAL TELEPHONE CORD WINDING DEVICE

BACKGROUND OF THE INVENTION

The present invention relates to a cord winding device. More particularly, the cord winding device includes a rotatable helical spool therein which is spring biased for cord retrieval and further includes a contact assembly therein which transfers current from a fixed contact element to a cord mounted on the spool of the device, the device operating in a manner to eliminate potential twisting of the cord.

PRIOR ART

Heretofore various cord winding structures have been proposed.

Some of these devices include a helical spool for maintaining turns of the cord isolated from one another.

For example, the Walton U.S. Pat. No. 3,128,857 discloses a reel device which includes a right hand and a left hand transfer roller therein. A portion of the cable wound around the outer periphery of the reel device extends into the device and is wound around the two rollers which are arranged to minimize rotation of the cable wound therearound. By provision of the two rollers, the need for providing rotary contacts is eliminated.

Further, the McWilliams et al. U.S. Pat. No. 3,147,833 discloses a coiler which includes a helically grooved spool upon which an electrical cord can be wound in a manner allowing a plug end of the cord to be freely rotatable with the spool. A torsion spring external of the spool is engaged to the spool in a manner to allow for uncoiling of the cord by simply pulling thereon, rewinding taking place under action of the spring. A ratchet type actuator is provided by means of which the torsion spring is locked into and unlocked from a chosen position, allowing the cord to remain uncoiled or to be coiled back around the spool, as desired.

Also, the Pilat U.S. Pat. No. 4,073,449 discloses an appliance cord reel having a helical spool, seated within a casing, about which the cord can be wrapped in a manner forming a single layer of touching turns of the cord. An intermediate housing in the form of a cylinder is provided which operates in the same fashion as a line distributing loop provided on a fishing reel.

As will be described in greater detail hereinafter, the cord winding device of the present invention differs from those previously proposed by providing a compact, simple structure incorporating a helical spool which is biased by a torsion spring internal to the spool. Locking of the spool in a chosen position is accomplished by a pinching action produced by the angle of the uncoiled cord relative to the angle at which the cord is coiled about the helical spool. A rotatable double contact assembly of the device accommodates its use with a cord having up to eight conductors therein.

SUMMARY OF THE INVENTION

According to the invention there is provided a cord winding device in combination with electrical cord members, the device comprising a housing, the housing including a slotted cylindrical member, a base member, and two end cap members; a helical spool extending within the cylindrical member and having ends thereof mounted within the housing in a rotatable manner; a biasing spring extending within the helical spool and being engaged with one end of the spool in a fixed manner and engaged with another end in a manner to be separately rotatable therefrom; the spring further being engaged at ends thereof between the end cap members and the base member of the housing in a manner where one end, which is fixedly engaged to the spool, is freely rotatable, and another end is engaged in a fixed manner to the housing; an electrical cord wound about the spool, the cord having conductors therein and being capable of being unwound from around the spool upon rotation of the spool; the device further including therein a rotating contact assembly for electrically engaging the conductors of the terminal end cord and the conductors of the spool wound cord, and comprising a contact plate to which the conductors of the terminal cord are engaged and rotating contact elements, each of which engages a specific conductor of the spool wound cord, and at least one electrical contact finger engaged to a corresponding terminal end cord conductor on the contact plate.

Still further according to the invention there is provided a cord winding device in combination with electrical cord members, the device comprising: a housing having means for engaging a biased helical spool therein; a helical spool having a hollow core and being engaged to the housing in a manner to be biased thereagainst; an electrical cord wound about the spool, the cord having conductors therein and being capable of being unwound from around the spool upon rotation of the spool; a fixed in position terminal end cord having conductors therein; the spool engaging means allowing for rotatability of the spool regardless of orientation of the housing; the biasing means being engaged within the core of the helical spool; a rotating contact assembly which electrically engages conductors of the fixed in position terminal end cord of the device with corresponding conductors of the spool mounted cord being rotatable therewith; the housing including a slot therein overlying the length of the spool, a free end of the spool mounted cord exiting therethrough.

BRIEF DESCRIPTION OF THE DRAWINGS

FIG. 1 is a perspective view of a telephone and shows the cord winding device of the present invention accommodating the handset cord of the telephone.

FIG. 2 is an enlarged perspective view of the cord winding device of FIG. 1, showing an element thereof for fixing the device to a supporting surface therefor and has a portion thereof broken away to show the handset cord wound around a helical spool of the device.

FIG. 3 is a longitudinal cross sectional view through the device and is taken along line 3-3 of FIG. 2.

FIG. 4 is an enlarged sectional view through a portion of the device and shows each turn of the handset cord seated within a corresponding groove in the helical spool in an isolated manner.

FIG. 5 is an exploded perspective view showing all structures forming the device.

FIG. 6 is a perspective view of a contact plate of the device.

FIG. 7 is an exploded perspective view showing the structures forming a contact assembly of the device.

FIG. 8 is a longitudinal cross sectional view of the contact assembly of FIG. 7.

FIG. 9 is a cross sectional view through the contact assembly and is taken along line 9—9 of FIG. 8.

DESCRIPTION OF THE PREFERRED EMBODIMENT

Referring now to the drawings in greater detail, there is illustrated therein the cord winding device of the present invention generally identified by the reference numeral 10.

To provide a simple example of one application for the device 10, it is shown in use with a handset cord 12 of a telephone 14.

As shown, the device 10 engages the handset cord 12 a short distance from its point of attachment to a base 16 of the telephone 14, with a major portion of the remainder of the cord 12 being wound about a helical spool 20 of the device 10, which is rotatably engaged to a housing 22 of the device 10 at longitudinal ends 24 thereof. The helical spool is formed of non conductive material and has a high walled helical channel 21 on the outer surface thereof.

A free end 25 of the cord 12 engages a handset 26 of the telephone 14 and upon lifting of the handset 26, the cord 12 is unwound off the spool 20 by the pulling action created by movement of the handset 26 away from the device 10.

Because of a chosen manner of engagement provided for the spool 20 to the housing 22, as will be described in greater detail hereinafter, the device 10 is functional regardless of its orientation. The device 10 may be engaged to any accommodating planar surface, even to the base 16 of the telephone 14.

Secure attachment to such supporting surface is accomplished with use of an adhesive bearing pad 27 which is provided on a bottom surface 28 of the housing 22.

As further shown, the housing 22 is in the form of an elongate rectangle, and is preferably formed from a cylindrical body section 30 engaged to a base section 32 by end caps 34 which engage the base section 32 in a particular fashion to be described hereinafter.

Within the cylindrical body section 30 is provided a longitudinal slot 36 through which the handset engaging end 25 of the cord 12 exits.

It will be understood that the cylindrical body section 30 of the housing 22 engages over the helical spool 20 of the device 10.

Seated within a hollow core 42 of the spool 20 and extending the entire length thereof is a spring member 43.

Each end 44 of the spring member 43 engages a corresponding hub, 46a or 46b, in a fixed manner. Thus, if one hub 46a is rotated relative to the other hub 46b, tension in the spring member 42 is decreased or increased, obviously depending on the direction of relative rotation.

In order to provide a rotatable helical spool 20 which will rewind itself under influence of the spring member 43, one end of the spool 20 is engaged to one of the hubs, 46a, in a fixed manner and engages about the other hub 46b in a manner to be freely rotatable therearound.

As stated above, the device 10 is operational regardless of its orientation.

Such a feature is provided by providing an engagement structure in the housing 22 which forms a yoke 50 for each end 24 of the spool 20.

The yokes 50 within which the ends 24 of the helical spool 20 rest are formed by providing a countersunk bore 52 in end portions of the housing 22 formed by and between the base member 32 and the end caps 34 engaged thereover.

When each end cap 34 is seated on the base member 32, the centered countersunk bore 52 is generated at each end of the housing 22.

One of the countersunk bores 52, bore 52', extends through the housing 22, allowing access to an end 54 of the hub 46b received therein.

As shown, the end 54 of the hub 46b is slotted and can engage a tool such as a screwdriver. The end 54 of the hub 46b further has a crossbore 56 therein which is adapted to engage a positioning pin 58 therein.

This pin 58 is engaged within the crossbore 56 after the spring 43 has been wound to provide the amount of rewind or recoil desired, by turning the hub 46b with a screwdriver while maintaining position of the hub 46a. Once the spring 43 is sufficiently loaded, the crossbore 56 in the hub 46b is aligned with a small corresponding bore 60 in the base member 32 of the housing 22, and the pin 58 is engaged within the bores 56 and 60, securing position of the hub 46b relative to the housing 22.

Because the helical spool 20 must rotate easily within the yoke 50 holding same, a flanged ring 64, one of which is shown in the drawings, is preferably positioned over each end 24 of the spool 20 prior to engaging the spool 20 within the yoke 50. Thus, a flange surface 66 of the ring 64 is always in contact with an abutting surface 68 of the yoke 50, assuring smooth rotation.

The helical spool 20 has an end slot 70 in one end 24 thereof. This slot 70 is provided so that an end portion 72 of the cord 12 can be fed therethrough, into communication with a contact assembly 80 of the device 10, a portion of which is centered within the helical spool 20 as will be defined hereinafter.

The contact assembly 80 allows the cord 12 engaged to the spool 20 to rotate with the spool 20 without twisting, while maintaining contact with conductors 84 of a fixed in position terminal end cord 82 which, in the illustrated example, engages the telephone base 16.

This terminal end cord 82 has the conductors 84 thereof fixed to one surface 86 of a contact plate, such as a circuit board 88. From the other surface 90 of the board 88, upwardly extending cooperating contact fingers 92 are seen to engage cooperating rotating contacts 94.

These rotating contacts 94 are mounted on a core 96 which is made of two cooperating halves 98 and 100, a portion of the core half 100 seating within a recess 102 in the hub 46a in a manner to be rotatable therewith.

It will be understood, of course, that conductors 104 in the cord 12 must be placed in communication with like conductors 84 engaged to the board 88 to maintain continuity of electrical communication through the device 10.

Accordingly, core section 100 has a center bore 106 therein which receives terminal end 72 of the cord 12 therein. This bore 106 tapers to a smaller bore 108 within which individual conductors 104 of the cord 12 are engaged in a manner to be isolated from one another.

Crossbores 110 engage smaller bore 108 and are positioned in a manner to each engage a particular rotating contact 94, with the rotating contacts 94 being aligned with particular contact fingers 92 of the board 88.

It will be understood that the core 96 is made of an insulating material. To assure no cross communication between the rotating contact elements 94, they are further isolated from one another by insertion of insulating washers 115 therebetween.

From FIG. 9, it will be seen that each finger contact 92 provided within the device is a double finger contact 92.

By providing such a double finger contacts 92, contact resistance is cut in half. As contacts age, resistance thereacross increases due to corrosion, and if only one contact finger were provided, resistance would increase at twice the rate of increase across a double contact. Obviously, a larger number of contacts could be provided, as desired, to further decrease build up of resistance. Also, the use of the contact fingers 92 rather than use of one of a variety of other contacts available in the disclosed embodiment should not be construed as limiting.

Thus, the cord 12 can rotate with the rotating spool 20 while electrical connection to the terminal cord 82 operating in unison with the rotating contacts 94 is maintained in a manner where twisting of the cord 12 is virtually eliminated.

In assembling the device 10 a free end 120 of the terminal cord 82 has its conductors 84 broken out and individually attached to chosen points on surface 86 of the circuit board 88. From the other surface 90 of the circuit board 88 contact fingers 92 of predetermined height extend upwardly. The circuit board 88 is engaged in a chamber 125 provided for same in one end of the base member 32 of the housing 22 with the remainder of the terminal cord 82 exiting the housing 22 via a bore 128 in the end thereof.

An end 72 of the cord 12 is fed through slot 70 in the spool 20 and into a crossbore 130 in the side of the hub 46a. The cord 12 then extends into throughbore 106 in the core 96 for the rotating contacts 94. The conductors 104 of the cord 12 are separated, and each is engaged to a corresponding rotating contact 94 by being fed into central channel 108 of the core 96, to a cross channel 110 which engages a corresponding contact 94, being held in electrical contact thereagainst in known manner.

The plurality of contacts 94 mounted on the core 96 are then seated within the housing 22 in such a manner where they engage corresponding double contact fingers 92 extending upwardly from the circuit board 88 seated therebeneath.

The spring 43 is placed within the helical spool 20. One end 44 of the spring 43 is then engaged to hub 46a in a fixed manner which in turn is mounted to helical spool 20 in a fixed manner. The other end of the spring 43 is then fixed to hub 46b in a manner to be rotatable relative to the spool 20.

The free end 25 of the cord 12 is passed through the slot 36 in the cylindrical body section 30 and is then connected to the handset 26.

The spring 43 and spool 20 assembly is now engaged within the cylindrical body portion 30.

The cylindrical body portion 30 is then seated upon base portion 32 of the housing so that the hubs 46a and 46b are engaged within the half sections of the yoke 50 defined therein, and the end caps 34 are engaged thereover.

While maintaining the spool 20 unable to rotate, hub 46b is turned to tension the spring 43. Once appropriate tensioning is obtained, positioning pin 58 is dropped into bore 60 at the bottom of the housing 22 and engages in bore 56 in hub 46b which is aligned therewith, securing hub 46b against rotation.

When the cord 12 is unwound at greater than an acute angle to the angle at which it is coiled about the spool 20, the free end of the cord 25 exits the slot 36 unhampered. However, when the unwound cord 12 is placed at an acute angle to that at which it is coiled, the cord 12 bears against a wall defining the longitudinal slot 36, locking the position of the spool 20. To cause release, the cord 12 need only be pulled at greater than an acute angle, and if pulling ceases, the spool 20 rewinds, coiling cord 12 therearound.

The end caps 34 are then tightened onto base member 32 by fixation devices, such as screws 130, in known manner.

As described above, the cord winding device 10 of the present invention provides a number of advantages, some of which have been described above and others of which are inherent in the invention.

Also, modifications may be proposed to the device 10 without departing from the teachings herein.

Accordingly the scope of the invention is only to be limited as necessitated by the accompanying claims.

I claim:

1. A telephone cord winding device in combination with telephone cord members, the device comprising a housing, the housing including a slotted cylindrical member, a base member, and two end cap members; a hollow spool on non conductive material extending within said cylindrical member, having ends thereof mounted within said housing in a rotatable manner and including a high walled helical channel in an outer surface thereof; a selectively loadable biasing spring extending along the length of said helical spool and being indirectly engaged with one end of the spool in a fixed manner and indirectly engaged with another end in a manner to be separately rotatable therefrom; said spring further being engaged at ends thereof between said end cap members and said base member of said housing in a manner where said spool engaging end is freely rotatable, and another end is engaged in a fixed manner to said housing; a telephone cord wound about said spool with turns of said cord being isolated from one another within said helical channel, said cord having conductors therein and being capable of being unwound from around said spool upon rotation of said spool; said device further including therein a rotating contact assembly for electrically engaging conductors of a terminal end cord and said conductors of said spool wound cord, and comprising a contact plate to which said conductors of said terminal cord are engaged and rotating contact elements, each of which engages a specific conductor of said spool wound cord, at least one electrical contact finger engaged to a corresponding terminal end cord conductor on said contact plate.

2. The device of claim 1 wherein said contact plate accommodates up to eight conductors.

3. The device of claim 2 wherein a plurality of rotating contact elements is provided, the plurality being equal to the number of conductors in the cord members.

4. The device of claim 3 wherein said contact plate is a circuit board.

5. The device of claim 4 wherein said rotating contact assembly includes a plurality of rotating contact elements, each of said contact elements being electrically isolated from the others, and engaging a particular conductor of the cord wound about said spool.

6. The device of claim 5 wherein said contact plate has a plurality of double contact forming fingers thereon, each pair of contact forming fingers being in contact with a particular rotating contact element at one end thereof and with a corresponding conductor of the terminal cord of the device at the other end thereof.

7. The device of claim 6 wherein said rotating contact elements are mounted on an insulating core which is fixedly engaged at one end thereof to said rotatable spool and is rotatably engaged within said housing at another end thereof.

8. The device of claim 7 wherein said insulating core has a plurality of channels therein through which each conductor of said spool wound cord may be brought into contact with a rotating contact element mounted on said core.

9. The device of claim 8 wherein said spring is engaged at one end thereof to a first hub and at another end thereof to a second hub, said spool also being engaged to and between said hubs.

10. The device of claim 9 wherein each hub is received within a yoke-like engagement structure provided at each end of said housing.

11. A telephone cord winding device in combination telephone cord members, the device comprising:
- a housing having means for engaging a biased hollow spool therein;
- a hollow spool having a high walled helical channel on an outer surface thereof and being engaged to said housing in a manner to be biased thereagainst;
- a telephone cord wound about said spool, said cord having conductors therein and being capable of being unwound from around said spool upon rotation of said spool;
- a fixed in position terminal end cord having conductors therein;
- said spool engaging means allowing for rotatability of the spool regardless of orientation of the housing;
- said biasing means being selectively loadable and engaged within and extending between ends of said helical spool by means of spool mounting hubs;
- a rotating contact assembly which electrically engages conductors of said fixed in position terminal end cord of the device with corresponding conductors of said spool mounted cord being rotatable therewith;
- said housing including a slot therein overlying the length of said spool, a free end of said spool mounted cord exiting therethrough and frictionally engaging thereagainst until released.

12. The assembly of claim 11 wherein said spool engaging means comprise a yoke formation in each end of the housing.

13. The assembly of claim 12 wherein said biasing means comprise a spring.

14. The device of claim 13 wherein said spring seats within said spool and indirectly engages one end of said spool in fixed manner and indirectly engages another end of said spool in a manner to be rotatable relative thereto.

15. The device of claim 14 wherein said end of said spool which is fixed to said spring engages rotating elements of said rotating contact assembly.

16. The device of claim 15 wherein said terminal end cord conductors engage a fixed contact plate.

17. The assembly of claim 16 wherein said fixed contact plate engages contact elements which engage said rotating elements of said rotating contact assembly.

* * * * *